United States Patent [19]
Pierce

[11] Patent Number: 5,315,918
[45] Date of Patent: May 31, 1994

[54] TAMPER-RESISTANT BRAKE ACTUATOR

[75] Inventor: William C. Pierce, Muskegon, Mich.

[73] Assignee: Nai Anchorlok, Inc., Muskegon, Mich.

[21] Appl. No.: 20,152

[22] Filed: Feb. 19, 1993

[51] Int. Cl.⁵ .......................... F01B 7/00; F01B 29/00; B25G 3/00
[52] U.S. Cl. ........................................ 92/63; 92/128; 92/130 A; 403/348; 403/270
[58] Field of Search .................... 92/48, 63, 130 A, 49, 92/169.1, 128; 403/348, 349, 350

[56] References Cited

U.S. PATENT DOCUMENTS

| 2,992,630 | 7/1961 | Leighton et al. | |
|---|---|---|---|
| 3,442,182 | 5/1969 | Brittain | 92/169.1 X |
| 3,478,519 | 11/1969 | Eggstein | 92/48 X |
| 3,572,217 | 3/1971 | Corry | 92/48 |
| 4,117,769 | 10/1978 | Carre et al. | 92/63 X |
| 4,565,120 | 1/1986 | Gray et al. | |
| 4,682,533 | 7/1987 | Hafner et al. | 92/169.1 X |
| 4,887,513 | 12/1989 | Ewald et al. | |
| 4,960,036 | 10/1990 | Gummer et al. | |
| 5,025,709 | 6/1991 | Miyazaki | 92/48 |
| 5,067,391 | 11/1991 | Choinski et al. | |

Primary Examiner—Edward K. Look
Assistant Examiner—John Ryznic
Attorney, Agent, or Firm—Varnum, Riddering, Schmidt & Howlett

[57] ABSTRACT

An air-operated combination diaphragm spring brake has a tamper-resistant connection between a head (46) and a spring side of a flange case (18) which together form a spring chamber (16) housing a power spring (66). The head (46) has an annular rim (70), and the flange case has an annular flange (78) with a diaphragm (48) sandwiched therebetween. A plurality of tabs (102) on one flange rotate into L-shaped channels (94) to lock the head to the flange case with a bayonet style engagement. An alternative embodiment employs threads (112, 114) on the head and adapter flanges to seal the spring chamber. A further embodiment seals the head to a cast flange case using a threaded hoop 116 fitted over the flange case to engage the threads on the head flange.

19 Claims, 7 Drawing Sheets

TAMPER-RESISTANT BRAKE ACTUATOR

BACKGROUND OF THE INVENTION

1. Field of the Invention

This invention relates to an improvement in air-operated combination diaphragm spring brake actuators of the type used with air brake systems on vehicles such as trucks. In one of its aspects, the invention relates to a spring brake actuator having a tamper-resistant spring chamber.

2. State of the Prior Art

Spring-applying brake actuators are in common use with air brake systems used on trucks, buses, and towed vehicles. Such actuators are typically provided with a service chamber for normally applying and releasing the brakes in response to delivery and exhaust of compressed air, and a spring chamber disposed in tandem with the service chamber for providing parking or emergency brake functions. A spring brake actuator uses spring force to operate a service brake actuator and apply brakes when pressurized air in the spring chamber is reduced below some predetermined level. Air pressure may be reduced in the spring chamber to apply the brakes under the control of the operator or automatically as a result of failure of the air system. The service chamber and spring chamber are separated by an adapter or flange casing which forms a wall between the two chambers.

In a typical spring brake, a barrel-shaped power spring is used to store energy and to exert the large force required for braking in the event of air pressure failure. Air pressure acting on a diaphragm or a piston is employed to compress the spring and maintain it in its brake release position. When the air is exhausted, the spring acts on the diaphragm, typically an elastomeric diaphragm or a piston, and through an actuating rod exerts the spring force on the service push rod to apply the brakes in the event of a failure of the system air pressure.

The spring brake actuator operates within the spring chamber, which is typically formed by clamping an elastomeric diaphragm between a head (sometimes also known as a spring housing or spring chamber) and the adapter. The power spring is typically compressed within the spring chamber between the head and the diaphragm. The spring has a high spring constant and typically weighs 3 pounds or more, being compressed to a linear length of less than 3 inches from an original uncompressed length in an extended condition of from 9 to 12 inches. With a high spring constant, the spring has a substantial amount of potential energy, exerting a force on the head of from 2,000 to 3,000 pounds.

In previous diaphragm style brake actuators, the brake actuator head is secured to the adapter by means of a band generally U-shaped in cross section, to clamp mating flanges on the head and adapter with the diaphragm clamped therebetween. Typically the band is formed of sections bolted together for convenient disassembly. Because the power spring is under great pressure, means must be provided to restrain or "cage" the power spring before the spring chamber can be safely disassembled. Failure to properly cage the power spring prior to disassembly and the resulting sudden release of potential energy in the spring can cause the head and adapter to fly apart.

To deter disassembly of the spring chamber, it is known to form the clamp band from a continuous ring, deformed over the flanges to form what is commonly termed a sealed brake. Safety is an advantage of a sealed brake. Because it must be deformed to be removed, a sealed brake clamp band or deformed flange deters disassembly of the spring chamber.

The same feature which makes sealed brakes safer also deters future repair, because disassembly is difficult without damaging the brake. If the diaphragm should fail for example, the entire brake actuator may need to be replaced. In any event, reconditioning of a sealed brake is a very difficult procedure.

U.S. Pat. Nos. 2,992,630 to Leighton et al., issued Jul. 18, 1961, and 4,887,513 to Ewald et al., issued Dec. 19, 1989, disclose bayonet closures for piston spring brake actuators. In a piston spring brake actuator, a piston is disposed for reciprocating movement within a cylinder, with a cap mounted to one end of the cylinder. A power spring operates between one side of the piston and the cap and is compressed by air pressure acting against the opposite side of the piston. When air pressure is lost, the spring urges the piston toward an actuating position, wherein a push rod actuates the brake. A bayonet connection between the cap and the cylinder provides a secure, yet releasable connection. However, bayonet closures such as those disclosed by Leighton and Ewald do not solve the problem of clamping a diaphragm between two housing members, without the diaphragm interfering with the connecting means.

SUMMARY OF THE INVENTION

In accordance with the present invention, a brake actuator head is clamped to an adapter in a diaphragm type fluid-operated brake actuator with a special bayonet clamp to effectively inhibit the detachment of the head from the adapter without first caging the power spring, thus providing a tamper-resistant brake actuator.

A fluid-operated brake actuator according to the invention comprises a generally cylindrical head having a first radially outwardly extending shoulder and a first annular rim extending axially from the first shoulder, and a flange case having a second radially extending shoulder and a second annular rim extending axially from the second shoulder. The first and second annular rims are in overlapping relationship with each other. An elastomeric diaphragm is positioned between the flange case and the head and has a circumferential peripheral edge between the first shoulder and the second shoulder. A connection connects the first annular rim and the second annular rim by rotation of the head with respect to the flange case.

The connection preferably comprises at least one radial projection on either the first annular rim or the second annular rim and a complementary radial recess on the other of the first annular rim and the second annular rim. The projection is received in the recess, so that portions of the first annular rim are in axial overlapping relationship with portions of the second annular rim.

Preferably, the brake actuator is provided with at least one locking mechanism to inhibit rotation of the head relative to the flange case. The locking mechanism can comprise a weld between the first and second annular rim. Alternatively, the locking mechanism comprises a first hole in the first annular rim, and a second hole in the second annular rim, the first and second holes being in registry. A pin is received in the first and second holes. The locking mechanism can also comprise a tab extending outwardly from one of the first and second annular rims, and a recess in the other of the first and second annular rims, the tab being in registry with the recess.

In one aspect of the invention, the radial recess is elongated and an axial recess extends from one end of the radial recess to an edge of the annular rim incorporating the axial recess to permit the introduction of the projection into the radial recess. To deter removal of the head from the flange case, an insert can be fixedly secured within the axial recess after the projection is received in the radial recess to inhibit rotation of the head relative to the flange case. The insert can further be secured by welding.

In another aspect of the invention, the connection comprises a threaded connection having a first threaded portion on the first annular rim and a complementary second threaded portion on the second annular rim, the first and second threaded portions being screwed together.

In a further aspect of the invention, the connection comprises a plurality of ridges on one of the first annular rim or the second annular rim, and a plurality of complementary grooves on the other of the first annular rim and the second annular rim. The ridges are received in the grooves and disposed at an acute angle to the axis of the actuator.

In a further aspect of the invention, the fluid-operated brake actuator comprises a generally cylindrical head having a first radially outwardly protruding shoulder and a first annular rim extending axially from the first shoulder, and a flange case having a second radially extending shoulder and a second annular rim extending axially from the second shoulder. The second annular rim is in overlapping relationship with the head first annular rim and is secured by a welded connection. An elastomeric diaphragm has a circumferential peripheral edge held in compression between the first shoulder and the second shoulder by the welded connection. Preferably, the first annular rim has at least one aperture, and the second annular rim has at least one other aperture in registry with the first aperture, and the welded connection comprises a plug weld filling the two apertures.

Further, one of the first annular rim and the second annular rim can have at least one radial projection. The other of the first annular rim and the second annular rim has at least one complimentary recess in registry with and receiving the radial projection. Portions of the first annular rim are thus in axial overlapping relationship with portions of the second axial rim and the overlapping portions prevent the head from separating from the flange case.

BRIEF DESCRIPTION OF THE DRAWINGS

The invention will now be described with reference to the accompanying drawings in which.

DETAILED DESCRIPTION OF THE DRAWINGS

Figure 1:
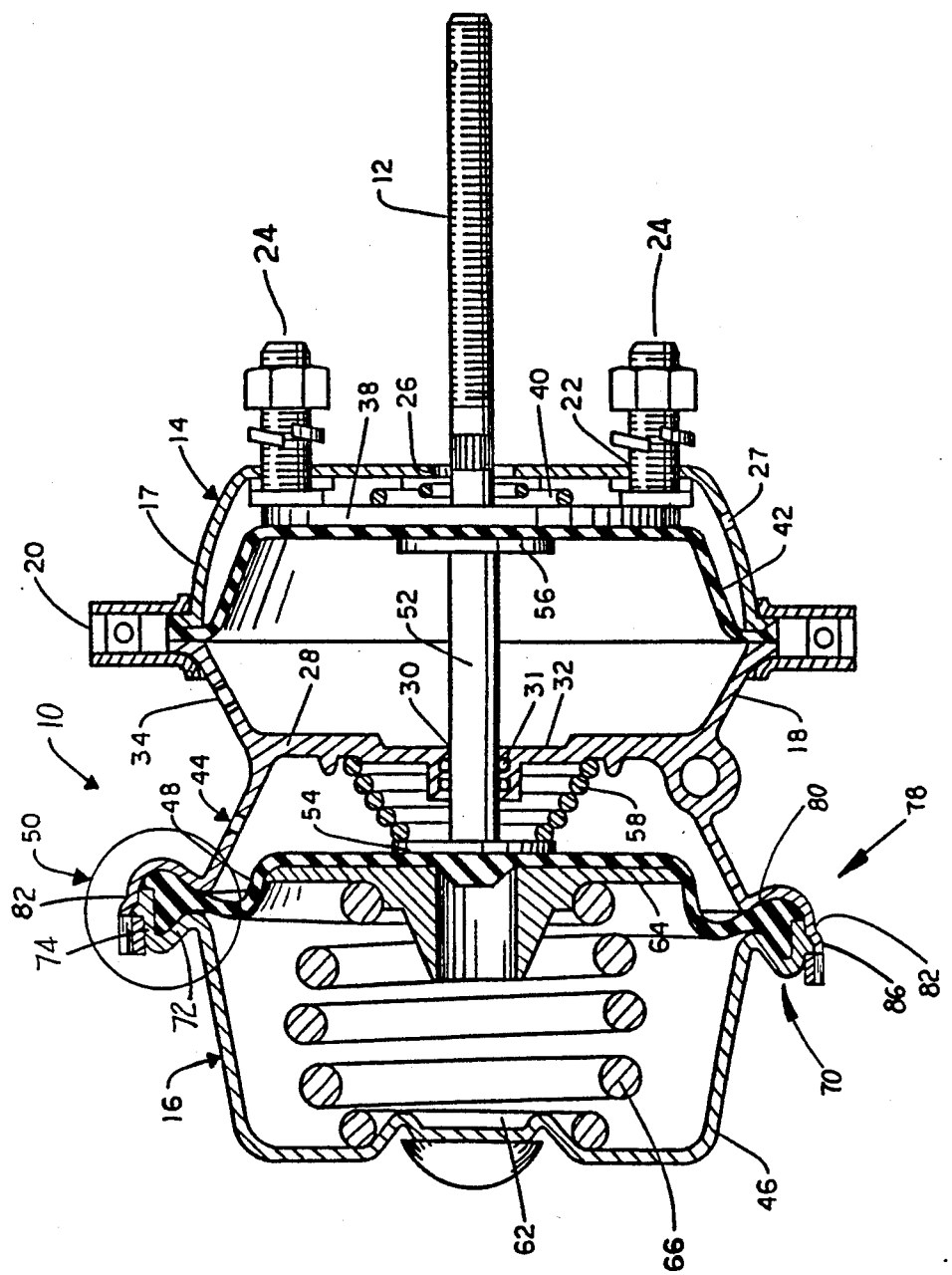
FIG. 1 shows a cross-sectional view of an air-operated combination diaphragm spring brake actuator according to the invention.
Figure 4:
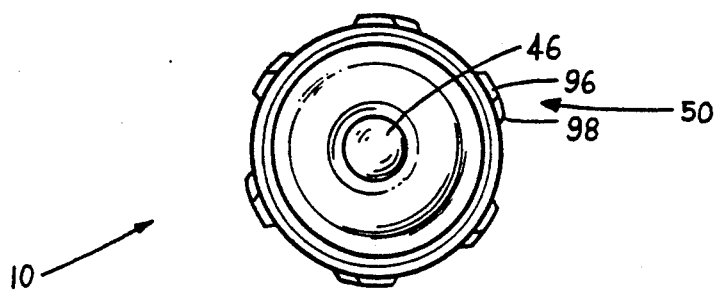
FIG. 4 is an end view of the actuator head of the air-operated combination diaphragm spring brake actuator of FIG. 1.

Referring now to FIGS. 1 and 4, there is shown a fluid-operated brake actuator 10 in accordance with the invention. The particular embodiment shown is an air-operated combination diaphragm spring brake actuator. The brake actuator is adapted to mount to a frame (not shown) of a vehicle and is further adapted to operate a brake (not shown) through a service push rod 12 which typically extends to and connects with a slack adjuster and the braking system of the vehicle.

The air-operated combination diaphragm spring brake comprises a service chamber 14 and a spring chamber 16 joined together in tandem. The service chamber 14 is defined by a cup-shaped service housing 17 and a double cup-shaped adapter 18 joined together through a clamp 20 to form a hollow interior chamber. The adapter 18 is sometimes also known as a flange case. A first elastomeric diaphragm 42 (also known as the service brake diaphragm) is clamped in fluid-tight engagement between the service housing 17 and the service side of the adapter 18. Openings 22 are provided in the service housing 17 for bolts 24 which bolt the service housing 17 to the vehicle. A central opening 26 and one or more vent openings 27 are also provided in the service housing 17.

The adapter 18 forms a divider wall 28 and has a central opening 30 with one or more 0-rings 31 positioned therein. An indentation or annular depression 32 is formed around the opening 30. An aperture 34 is provided in the adapter 18 for providing communication between a source of pressurized air (not shown) and the portion of the service chamber 14 between the diaphragm 42 and the adapter 18 to permit air to act upon the diaphragm in a manner to be described.

The service push rod 12 is mounted within the service chamber 14 for reciprocation within the central opening 26 and mounts a service push rod plate 38 at an inner end thereof. A service return spring 40 extends between a central portion of the service housing 17 and the service push rod plate 38 to bias the service push rod plate 38 and thus the service push rod 12 inwardly of the service chamber 14 to release the brake. The spring biased service push rod plate 38 normally forces the diaphragm 42 against the divider wall 28 on the service side of adapter housing 18 in the brake release position.

When air pressure is supplied through the aperture 34 as, for example, when the brakes are applied by a vehicle operator, air pressure is introduced between the diaphragm 42 and the divider wall 28, thereby forcing the diaphragm 42 toward the position shown in FIG. 1. In this manner, the service push rod 12 is extended outwardly of the service chamber 14, as illustrated, to apply braking pressure to the vehicle brakes in a conventional fashion. Conversely, release of air pressure between the diaphragm 42 and the divider wall 28 enables the return spring 40 to urge the service push rod 12 to move to the left in FIG. 1, thereby retracting the push rod 12 and releasing the brake.

The spring chamber 16 is defined by the spring side of the adapter 18 and a generally cylindrical head 46 or spring housing which is clamped to the spring side of the adapter 18 through a clamping mechanism 50. It is the clamping mechanism 50 which forms the subject matter of the invention as will be hereinafter shown. A second elastomeric diaphragm 48 known as the spring diaphragm is clamped in fluid-tight engagement between the spring side of adapter 18 and the head 46 by the clamping mechanism 50.

An aperture 44 is provided within the spring side of the adapter 18 to connect the spring chamber 16 with a source of pressurized air (not shown). An adapter push rod 52 is mounted within the adapter 18 to extend within the spring chamber 16 and has a reaction plate 54 rigidly mounted to one end, and a second reaction plate 56 mounted to the other end thereof. The adapter push rod 52 extends through the opening 30 and in sealing engagement with at least one 0-ring 31. The reaction plate 56 seats within the annular depression 32 of the divider wall 28. An adapter return spring 58 is mounted within the spring chamber 16 between the divider wall 28 and the reaction plate 54 to bias the adapter push rod 52 into the release position.

A pressure plate 64 bears against the diaphragm 48. A power spring 66 is positioned between the pressure plate 64 and the head 46 to bias the pressure plate 64 and the push rods to a brake actuating position as viewed in FIG. 1. Typically the adapter 18 is formed of cast aluminum and the actuator head 46 is formed of stamped or spun low-carbon steel, although the adapter 18 can also be formed of steel.

A release tool (not shown) can be provided within a central opening 62 of the head 46 for mechanically drawing the pressure plate 64 into a retracted or "caged" position in the event there is a need to mechanically release the brake. The release tool typically comprises a threaded rod having a nut threaded on the end thereof and a washer which bears against the outer surface of the head 46. Projections on the end of the threaded rod are selectively engageable with portions of the pressure plate 64 in a manner well known in the spring brake field, such as shown in U.S. Pat. No. 3,291,004 to Stevenson et al., issued Dec. 13, 1966.

In operation, air pressure is continually supplied to the spring chamber 16 through the aperture 44 to maintain the spring diaphragm 48 in a position to compress the power spring 66. In this position, the service push rod 12 normally will be operated, as described above, by selective pressurization of air into the service chamber 14 through the aperture 34. However, in the event of a loss of pressure, either intentionally, as when the parking brake is set, or by failure of the air pressure system, the pressure in the spring chamber 16 will be decreased so that the service return spring 40 and adapter return spring 58 would no longer be able to overcome the pressure of the much larger and stronger power spring 66. Thus, the pressure plate 64 forces the spring diaphragm 48, and thus the adapter push rod 52 outwardly to the position shown in FIG. 1, thereby also forcing the service push rod 12 outwardly to apply braking pressure to the brakes.

Figure 2:
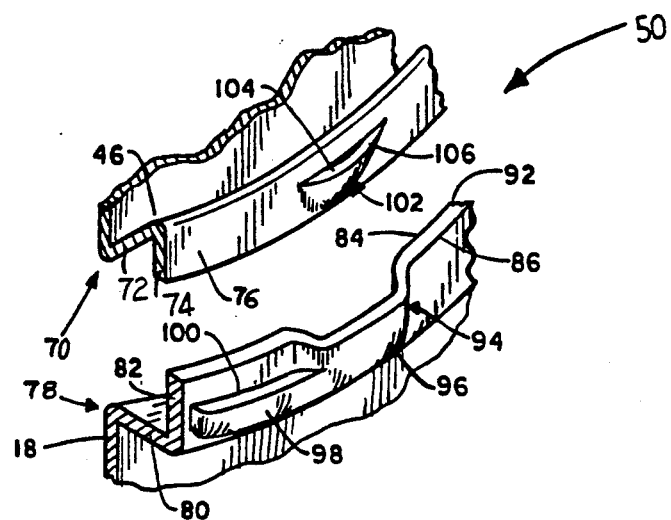
FIG. 2 is a partial isometric view of the clamping mechanism used in the spring brake actuator shown in FIG. 1 but shown in the separated state.
Figure 3:
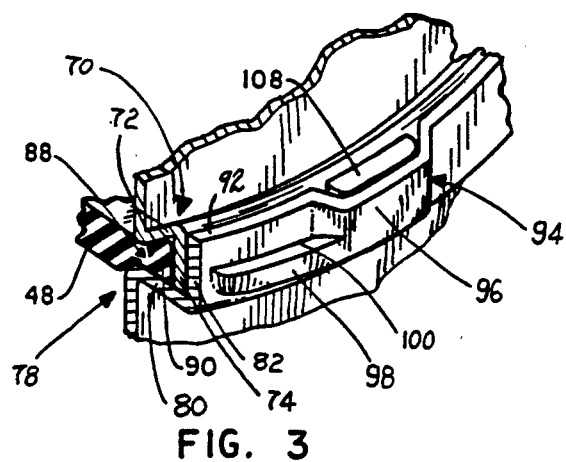
FIG. 3 is an isometric view of the clamping mechanism of FIG. 2 shown in the clamped state and illustrating first embodiment of a locking mechanism according to the invention.

Referring to FIGS. 2 and 3, the head 46 has an annular flange 70 comprising a radially outwardly protruding shoulder 72 and an annular rim 74 extending axially from the shoulder 72. The annular rim 74 has an annular outward face 76. The adapters 18 has an annular flange 78 comprising a radially outwardly protruding shoulder 80 and an annular rim 82 extending axially from the shoulder 80. The adapter annular rim 82 has an annular inward face 84 and an annular outward face 86.

As shown in FIG. 3, the adapter annular rim 82 has a slightly larger diameter than the head annular rim 74, so that, when assembled, the outward face 76 on the head annular rim 74 is in a confronting relationship to the inward face 84 on the adapter annular rim 82. A circumferential peripheral edge 88 of the spring diaphragm 48 is disposed between the head shoulder 72 and the adapter shoulder 80. Preferably, the head shoulder 72 and the adapter shoulder 80 diverge slightly as shown in FIG. 3 as they extend outwardly radially, to retain an annular thickening or bead 90 at the peripheral edge 88 of the spring diaphragm 48. The adapter annular rim 82, which extends over the shoulder annular rim 74, terminates at a terminal annular edge 92.

A plurality of L-shaped channels or recesses 94 are formed about the circumference of the inward face 84 of the adapter annular rim 82 (see also FIG. 4). Each channel 94 comprises an axial portion 96 and a circumferential portion 98. The axial portion 96 of each channel 94 extends from the terminal annular edge 92 axially towards the shoulder 80. The circumferential portion 98 of each L-shaped channel 94 extends circumferentially from the bottom, or portion closest to the shoulder 80, of the axial portion 96, a distance approximately equal to the width of the axial portion 96. The circumferential portion 98 thus undercuts the terminal annular edge 92 and forms a lip 100 along the lower surface of the material of the adapter annular rim 82 above the circumferential portion 98.

Preferably, the L-shaped channel 94 is formed by bending the material of the adapter annular rim 82 outwardly, as with a pair of forming dies, to form the L-shaped channel 94. To create a more succinct transition between the channel 94 and the annular rim 82, the lip 100 can be formed by cutting the material of the annular rim 82 circumferentially immediately above the circumferential portion 98 so that the material separates during the forming to form the lip 100.

A radial projection or tab 102 is formed in the outward face 76 of the head annular rim 74 and is adapted to be received in the L-shaped channel 94. Preferably, each tab 102 is formed by making a circumferential incision 104 in the material of the head annular rim 74 and pushing the material below the incision 104 outwardly. This forms a succinct lip 106 on the upper edge of the material pushed outwardly. The width of the tab 102 should be sized so that the tab 102 fits snugly into the L-shaped channel 94. Tabs 102 can be formed in successive stamping operations with a pair of forming dies.

To assemble the head 46 to the adapter 18, the mating tabs 102 and axial portions 96 of L-shaped channels 94 are aligned. The head 46 is then moved inwardly of the adapter 18, with the circumferential peripheral edge 88 compressed between them, until the tabs 102 reach their inward limit of travel in the axial portions 96 of the L-shaped channels 94. In this position, the diaphragm edge 88 will be under great compression at the bead 90 causing the bead to flow and effectively fill any space between the flanges 70, 78, thereby creating an air tight seal. The head 46 and adapter 18 are then rotated relative to each other so that the tabs 102 move into the circumferential portion 98 of the L-shaped channels 94. In this position, the lips 106 on the tabs 102 fit beneath the lips 100 on the L-shaped channels 94, and restrain axial movement of the head 46 with respect to the adapter 18. The compression force in the diaphragm bead 90 and the force in the power spring 66 hold the tabs 102 firmly against the lips 100.

To deter disassembly, a metal insert 108 can be inserted into the axial portion 96 of one or more L-shaped channels 94. Each insert 108 is sized to virtually fill the axial portion 96 and thereby prevent the counter rotation of the tab 102 into the axial portion 96 of the L-shaped channel 94. To further deter manual separation of the head 46 from the adapter 18, the metal inserts 108 can be welded into place. With the inserts 108 welded into place, the clamping mechanism 50 prevents removal of the head 46 from the adapter 18 without deforming or otherwise removing the metal inserts 108. The invention thus provides an effective tamper-resistant brake actuator.

Figure 5:
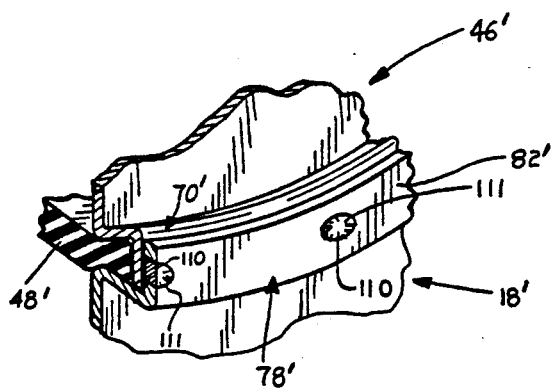
FIG. 5 is a partial isometric view like FIG. 2 of a second embodiment of a locking mechanism according to the invention.

A second embodiment of a locking mechanism, according to the invention is shown in FIG. 5 where like numerals have been used to designate like parts. A plurality of holes 110 are formed about the circumference of the adapter annular rim 82' prior to assembly. After assembly, the holes 110 are filled with plug welds 111 to prevent rotation of the head 46 relative to the adapter 18.

The invention is not limited to the embodiments shown in FIGS. 1 through 5. For instance, the head annular rim 74 can be adapted to fit over, rather than within, the adapter annular rim 82, with the tabs 102 on the adapter annular rim 82, and the L-shaped channels 94 on the head annular rim 74.

Figure 6:
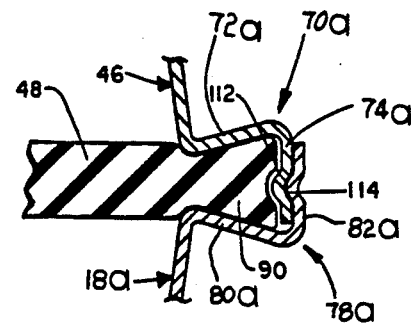
FIG. 6 is an enlarged sectional view of a portion of a spring brake actuator and showing a second embodiment of a clamping mechanism according to the invention.
Figure 7:
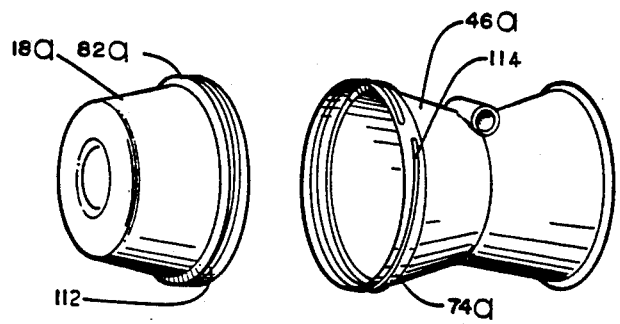
FIG. 7 is a perspective view of the actuator head and flange casing of FIG. 6, shown prior to assembly.

A second embodiment of a clamping mechanism, according to the invention, is illustrated in FIGS. 6 and 7 where like numerals are used to designate like parts. In this embodiment, the flanges 70a, 78a are similar to those described above 70, 78, and illustrated in FIGS. 1 through 4. However, a screw thread 112 is formed on the head annular rim 74a, and a mating thread 114 is formed on the adapter annular rim 82a. Preferably, the threads 112, 114 are formed in a continuous annular spiral, making approximately one complete revolution of the annular rims 74a, 82a. However, other thread arrangements are equally practicable.

To attach the head 46a to the adapter 18a, the threads 112, 114 are mated, and the head 46a is screwed tightly onto the adapter 18a. To deter manual separation of the head 46a from the adapter 18a, the second embodiment of the locking mechanism (the plurality of holes 110 and plug welds ill about the circumference of the adapter annular rim 82a) can be used to fix the adapter 18a to the head 46a (see FIG. 5). The plug welds 111 will prevent undesirable rotation of the head 46 with respect to the adapter 18.

In the first two embodiments of the clamping mechanism, the actuator head 46 or 46a and the adapter 18 or 18a are formed of low carbon steel. The adapter 18 or 18a can be formed by attaching two separate cup-shaped pieces back to back to form a single double cup-shaped adapter 18 or 18a. Each cup-shaped piece can be formed by well-known stamping or spinning operations. It is a common practice in the industry to cast adapters 18 from aluminum. A screw thread arrangement of the second embodiment of the clamping mechanism can also be used with a cast aluminum adapter 18. The thread 112 can be cast or machined into the adapter annular rim.

Figure 8:
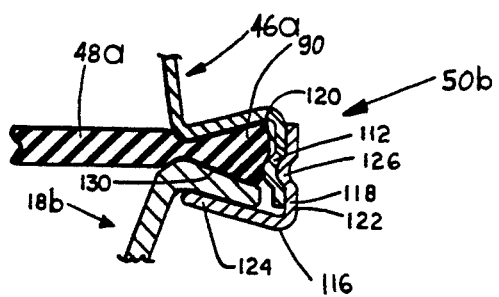
FIG. 8 is an enlarged sectional view of the portion of a spring brake actuator and showing a third embodiment of a clamping mechanism according to the invention.

FIG. 8 shows a third embodiment of a clamping mechanism 50b, according to the invention, whereby a threaded hoop 116 connects the head 46a to a cast adapter 18b. The head 46a has the same configuration as in the second embodiment. The hoop 116 comprises an annular rim 118 having an inwardly directed face 120, an outwardly directed face 122, and an inwardly directed flange 124. A screw thread 126, similar to the thread 114 on the adapter 18a in the second embodiment, is provided on the inward face 120 of the annular rim 118. The threads 126 and 112 mate in the same fashion as the threads 114 and 112 in the embodiment shown in FIGS. 6 and 7. The inwardly directed flange 124 on the hoop 116 engages an outwardly directed annular flange 128 on the adapter 18b, to hold the adapter 18b to the head 46a. The adapter flange 128 has a diverging radially disposed upper face 130 to receive the bead 90 on the diaphragm 48.

Figure 9:
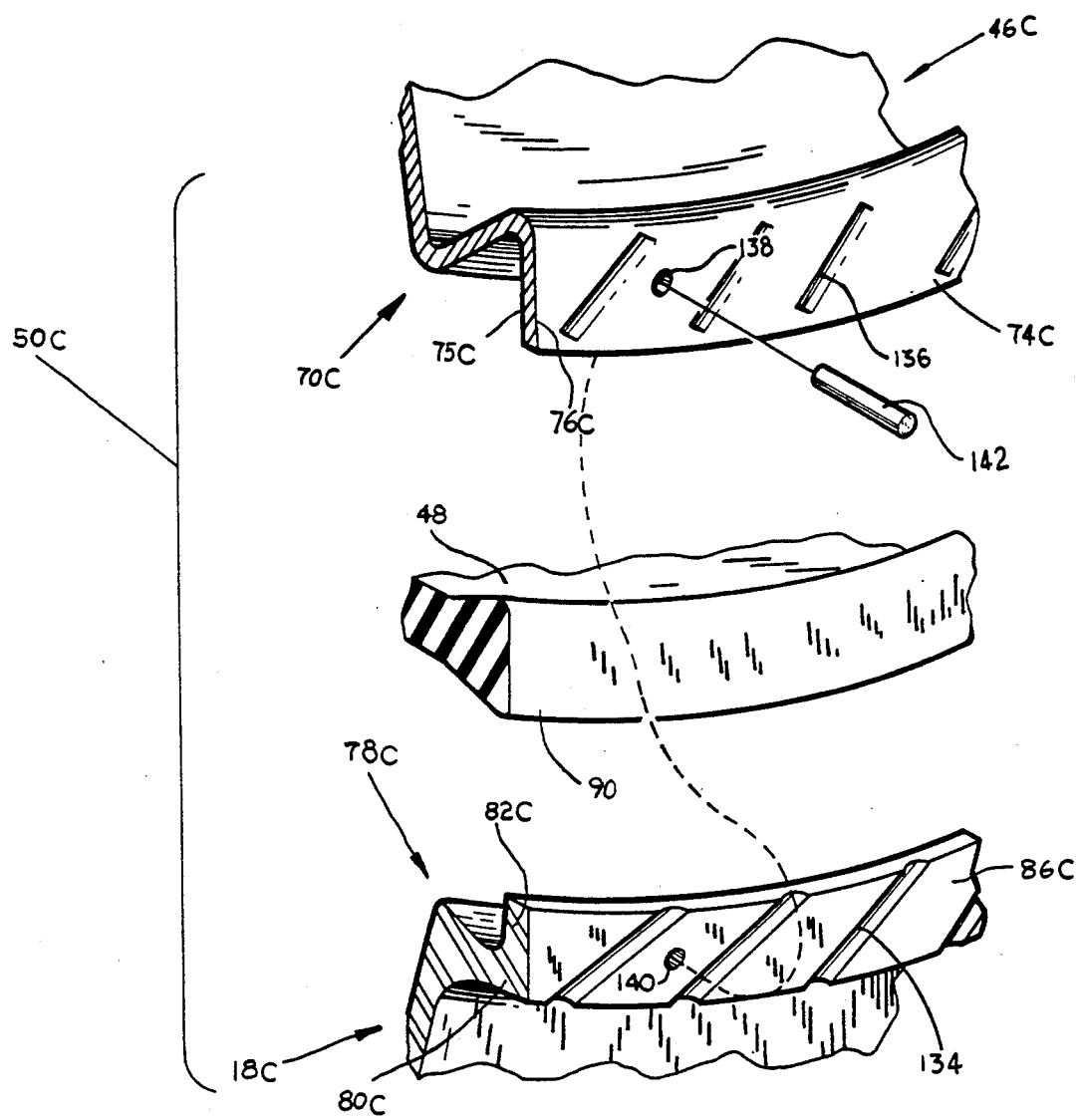
FIG. 9 is an exploded perspective sectional view of a portion of a spring brake actuator and showing a fourth embodiment of a clamping mechanism and a third embodiment of a locking mechanism according to the invention.

FIG. 9 shows a fourth embodiment of a clamping mechanism 50c and a third embodiment of a locking mechanism according to the invention. The adapter 18c is preferably formed of cast aluminum. The annular flange 78c on the adapter is integrally cast to include the shoulder 80c and annular rim 82c. However, because the adapter is formed of cast material, the shoulder 80c and annular rim 82c are somewhat thickened to provide additional strength. The rim 74c of the head 46c annular flange 70c has an inner face 75c which, when the clamping mechanism 50c is assembled, overhangs and is in a confronting relationship with the adapter rim outer face 86c.

A series of grooves 134 are formed in the adapter rim outer face 86c. Each groove 134 is disposed obliquely approximately at 45 degree angle to the axis of the adaptor across the rim outer face 86c. A series of corresponding ridges 136 is formed into the inner face 75c of the head annular flange rim 70c. The ridges 136 can be formed by stamping the head annular flange rim outer face 76c between a pair of shaped dies (not shown).

To clamp the spring chamber, the power spring 66 (not shown) is caged and the diaphragm 48 is installed with some lubricant on the bead 90. The head 46c is positioned so that the head annular flange 70c overlies the adapter annular flange 78c with the ridges 136 aligned with the grooves 134. The head 46c and adapter 18c are pushed together and rotated slightly so that the ridges 136 slide into the grooves 134.

The head 46c and adapter 18c can be held together in assembled condition with an interference fit which is essentially permanent. Prior to assembly, the head 46c is heated to a temperature above 200° F. and the adapter 18c is cooled to a temperature below −40° F. to achieve a 0.010 inch clearance between the parts. After the parts reach an equilibrium temperature, the head 46c shrinks and the adapter 18c expands so that they are held together by a 0.015 inch interference fit or less.

Additional or alternate locking of the head 46c to the adapter 18c can be employed, as illustrated by the third embodiment of the locking mechanism illustrated in FIG. 9. Holes 138 penetrating the head flange rim 74c, aligned with holes 140 penetrating the adapter flange rim 82c, receive pins 142 to prevent the head 46c from rotating relative to the adapter 18c. The pins 142 can have an interference fit with the holes 138 on the head flange rim 74c to form a permanent seal or can be welded in place.

Figure 10:
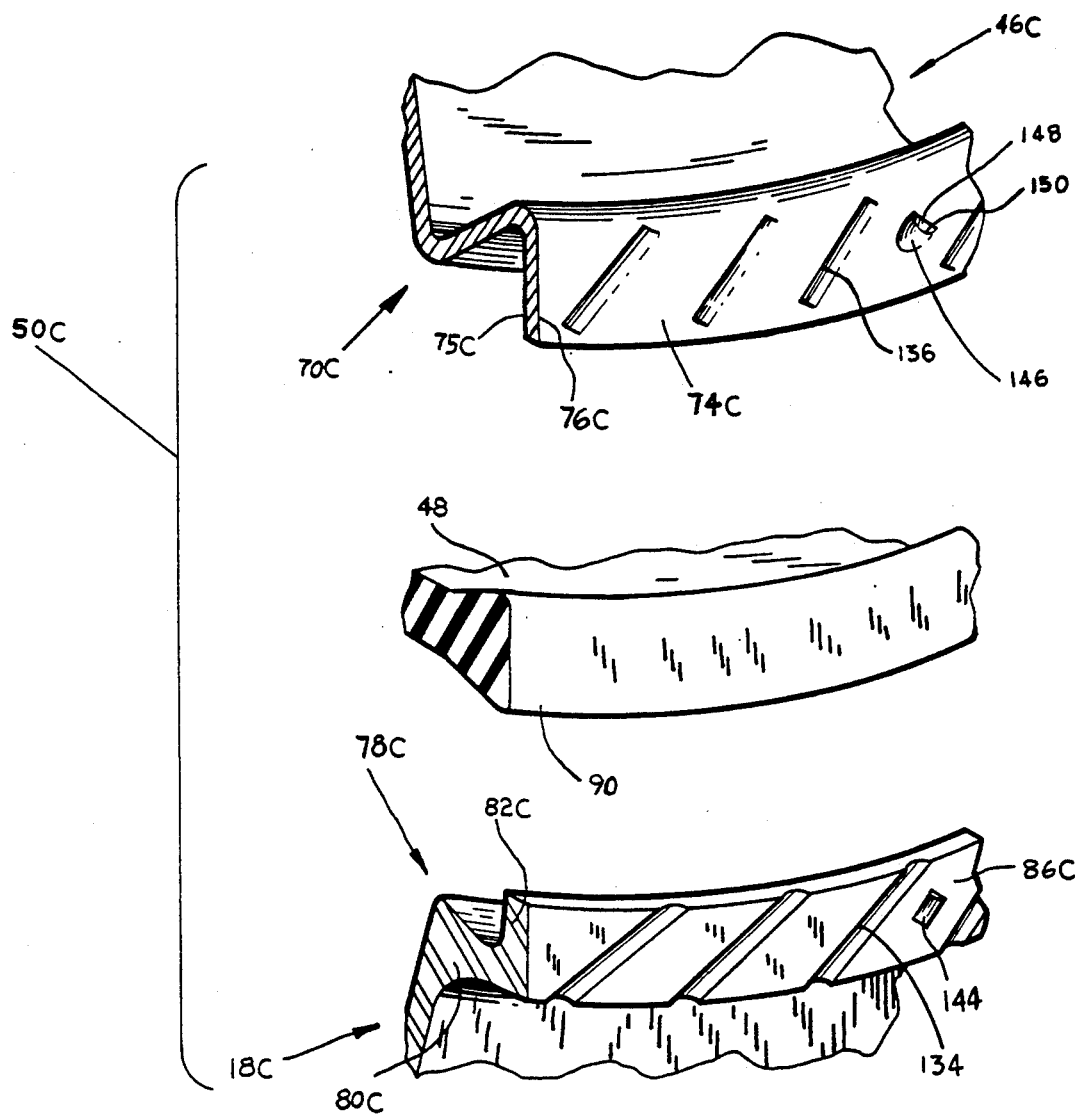
FIG. 10 is an exploded perspective sectional view of the clamping mechanism of FIG. 9, shown with a fourth embodiment of a locking mechanism according to the invention.

Turning to FIG. 10 where like numerals have been used to designate like parts, a fourth embodiment of a locking mechanism according to the invention comprises forming a series of sharp edged pockets or wells 144 in the outer face 86c of the adapter flange rim 82, each of which receives a tab 146 extending from the head annular flange rim inner face 75c. The tabs 146 are preferably formed similarly to the tabs 102, by making a series of incisions 148 through the wall of the head flange rim 74c which align with the wells 144 after the head 46c and adapter 18c are assembled. The material of the head flange rim 74c overlying each well 144 is then pushed inwardly from the head flange rim outer face 76, forming an edge 150 which engages the well 144 to prevent the head 46c from moving relative to the adapter 18c. The ridges 136 in the grooves 134 prevent axial movement of the head 46c with respect to the adapter 18c, and the pins 142 or tabs 146 prevent rotational movement of the head 46c with respect to the adapter 18c.

Figure 11:
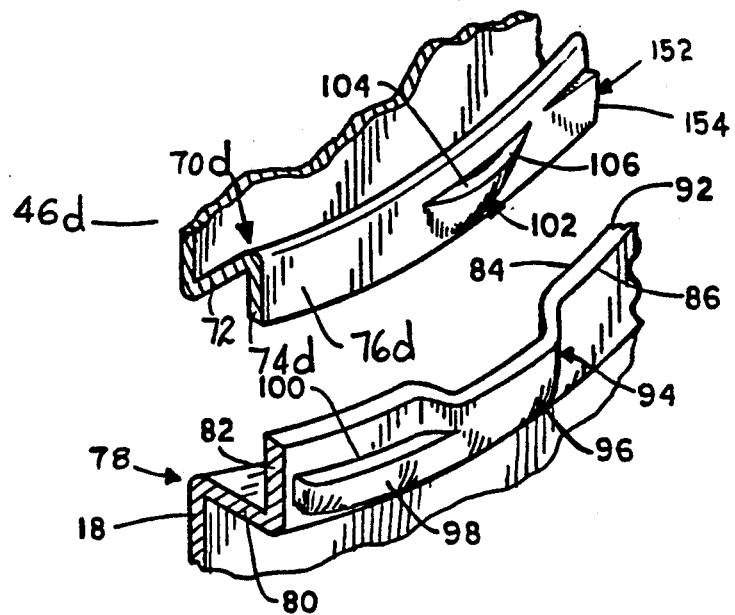
FIG. 11 is an isometric view of the clamping mechanism of FIG. 2, shown in the separated state, with a fifth embodiment of a locking mechanism according to the invention.
Figure 12:
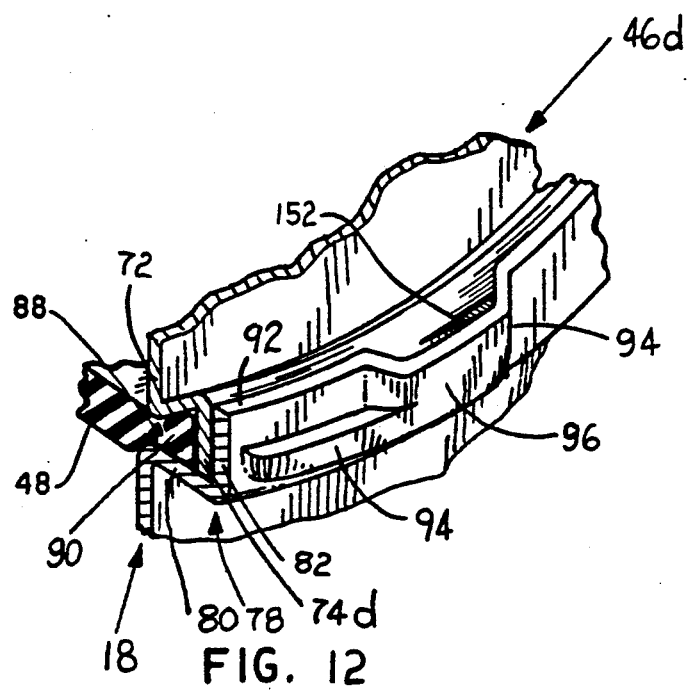
FIG. 12 is an isometric view of the clamping mechanism and locking mechanism of FIG. 11, shown in the clamped state.

FIGS. 11 and 12 illustrate a fifth embodiment of a locking mechanism, according to the invention, particularly suited for the first embodiment of the clamping mechanism 50 shown in FIGS. 1 through 5. A locking tab 152 extends outwardly from the annular rim 72d outer face 76d in a position to engage the axial portion 96 of the L-shaped channels 94 to prevent rotation of the head 46d relative to the adapter 18. Each locking tab 152 has a configuration similar to the aforementioned tabs 102 and 146 and extends outwardly from the annular rim outer face 76 to form a distal edge 154. A locking tab 152 can be associated with each axial portion; hence, there can be multiple locking tabs 152 around the periphery of the clamping mechanism. Because the locking tabs 152 extend outwardly, rotation of the tab 146 in the circumferential portion 98 of the L-shaped channel 94, from a position to the right of the axial portion 96, to a position within the axial portion 96, is not impeded. However, once the locking tab 152 enters the axial portion 96, the distal edge 154 engages the walls of the axial portion 96 to prevent rotation in the opposite direction (to the right as viewed in FIGS. 11 and 12).

Figure 13:
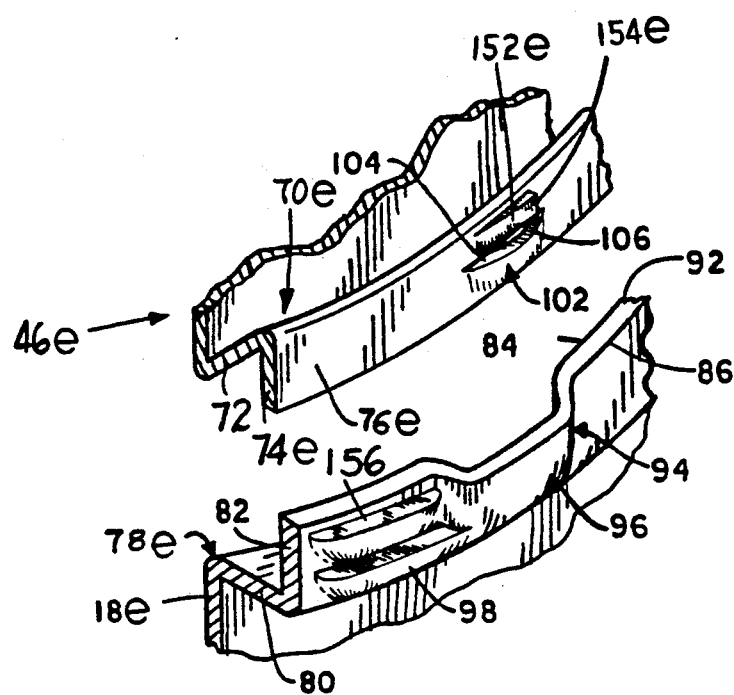
FIG. 13 is an isometric view of the clamping mechanism of FIG. 2, shown in the separated state, with a fifth embodiment of a locking mechanism according to the invention.
Figure 14:
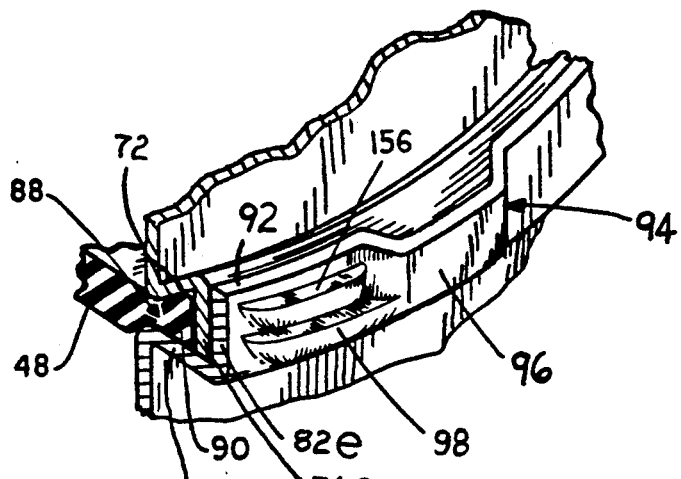
FIG. 14 is an isometric view of the clamping mechanism and locking mechanism of FIG. 13 shown in the clamped state.

FIGS. 13 and 14 illustrate a sixth embodiment of a locking mechanism, according to the invention, for use with the first embodiment of the clamping mechanism 50. Like numerals have been used to designate like parts. The locking tab 152e is essentially aligned axially with the tab 102. A separate well 156 in the inward face 84e of the adapter annular rim 82e receives the tab 152e when the clamping mechanism 50 is rotated to the closed position illustrated in FIG. 1. During assembly of the clamping mechanism 50, the locking tab 152e is inserted into the axial portion 96 of the L-shaped channel 94. As the head 46e is rotated to the left with respect to the adapter housing 18e to the closed position illustrated in FIG. 14, the locking tab 152e slides into the well 156. The distal edge 154e of the locking tab 152e engages the well 156 to prevent counter rotation of the head 46e. A number of locking tabs 152e and wells 156 are preferably provided.

In each of the foregoing embodiments, the force of the power spring 66 pressing against the clamping mechanism 50, as well as the compression of the diaphragm peripheral edge, whether it be a bayonet connection or a threaded connection, will inhibit rotation of the head 46 relative to the adapter 18, thereby rendering it difficult to release the connection.

The locking variations, pins 142, tabs 146 or 152, and plug welds 110, are suitable for use with any of the disclosed clamping mechanisms, or possibly as a stand alone clamping mechanism, in which event they would need to be adapted to carry the full separation load of the spring chamber 16. Also, each of the foregoing clamping structures is appropriate for clamping of the service housing 17 to the adapter 18. Since the service chamber 14 contains no high energy spring, it need not be permanently clamped. To the contrary, it is desirable to allow access to the service chamber 14 for repair. For instance, the insert 108 of the clamping mechanism 50 need not be fully welded in place, tack welding or a friction fit being sufficient if this clamp were used for the device chamber. In the fourth embodiment of the clamping mechanism, the pins 142 can be removable in some fashion, as by threading the pins 142, if this embodiment is used for the service chamber clamp.

Reasonable variation and modification are possible within the scope of the foregoing disclosure without departing from the spirit of the invention which is defined in the accompanying claims.

The embodiments of the invention in which an exclusive property or privilege is claimed are as follows:

1. A fluid-operated brake actuator comprising;
   a generally cylindrical head having a first radially outwardly extending shoulder and a first annular rim extending axially from the first shoulder,
   a flange case having a second radially extending shoulder and a second annular rim extending axially from the second shoulder and in radial overlapping relationship with the head first annular rim,
   an elastomeric diaphragm between the flange case and the head and having a circumferential peripheral edge between the first shoulder and the second shoulder; and
   a connection for connecting the first annular rim and the second annular rim by rotation of the head with respect to the flange case.

2. A brake actuator according to claim 1 wherein the connection comprises at least one radial projection on one of the first annular rim and the second annular rim and a complementary radial recess on the other of the first annular rim and the second annular rim, the projection being received in said recess whereby portions of the first annular rim are in axial overlapping relationship with portions of the second annular rim.

3. A brake actuator according to claim 2 and further comprising at least one locking mechanism to inhibit rotation of the head relative to the flange case.

4. A brake actuator according to claim 3 wherein the locking mechanism comprises a weld between the first and second annular rim.

5. A brake actuator according to claim 3 wherein the locking mechanism comprises a first hole in the first annular rim, and a second hole in the second annular rim, the first and second holes being in registry and a pin received in the first and second holes.

6. A brake actuator according to claim 3 wherein the locking mechanism comprises a tab extending outwardly from one of the first and second annular rims, and a well sunk into the other of the first and second annular rims, the tab being in register with the well.

7. A brake actuator according to claim 2 wherein the radial recess is elongated and an axial recess extends from one end of the radial recess to an edge of the other of said first annular rim and said second annular rim to permit the introduction of the projection into the radial recess.

8. A brake actuator according to claim 7 wherein an insert is fixedly secured within the axial recess after the projection is received in the radial recess to inhibit rotation of the head relative to the flange case to deter removal of the head from the flange case.

9. A brake actuator according to claim 8 wherein the insert is secured by welding.

10. A brake actuator according to claim 1 wherein the connection comprises a threaded connection having a first threaded portion on the first annular rim and a complementary second threaded portion on the second annular rim, the first and second threaded portions being screwed together.

11. A brake actuator according to claim 1 wherein the connection comprises a plurality of ridges on one of the first annular rim and the second annular rim and a plurality of complementary grooves on the other of the first annular rim and the second annular rim, the ridges being received in said grooves and disposed at an acute angle to an axial axis of the actuator.

12. A brake actuator according to claim 11 and further comprising at least one locking mechanism to inhibit rotation of the head relative to the flange case.

13. A brake actuator according to claim 1 and further comprising at least one locking mechanism to inhibit rotation of the head relative to the flange case.

14. A brake actuator according to claim 13 wherein the locking mechanism comprises a weld between the first and second annular rim.

15. A brake actuator according to claim 13 wherein the locking mechanism comprises a first hole in the first annular rim, and a second hole in the second annular rim, the first and second holes being in registry and a pin received in the first and second holes.

16. A brake actuator according to claim 13 wherein the locking mechanism comprises a tab extending outwardly from one of the first and second annular rims, and a well sunk into the other of the first and second annular rims, the tab being in register with the well.

17. A fluid-operated brake actuator comprising;
a generally cylindrical head having a first radially outwardly protruding shoulder and a first annular rim extending axially from the first shoulder,
a flange case having a second radially extending shoulder and a second annular rim extending axially from the second shoulder and in overlapping relationship with the head first annular rim and being secured thereto by a welded connection, and
an elastomeric diaphragm having a circumferential peripheral edge held in compression between the first shoulder and the second shoulder by the welded connection.

18. A brake actuator according to claim 17 wherein the first annular rim has at least one aperture, and the second annular rim has at least one other aperture in registry with the at least one aperture, and the welded connection comprises a plug weld filling the two apertures.

19. A brake actuator according to claim 17 wherein the one of the first annular rim and the second annular rim have at least one radial projection and the other of the first annular rim and the second annular rim have at least one complimentary recess in registry and receiving the at least one radial projection, whereby portions of the first annular rim are in axial overlapping relationship with portions of the second axial rim and said overlapping portions prevent said head from separating from said flange case.

* * * * *